(12) United States Patent
Iyer et al.

(10) Patent No.: US 7,450,531 B2
(45) Date of Patent: Nov. 11, 2008

(54) SYSTEM AND METHOD FOR ALLOCATING AND DISTRIBUTING END USER INFORMATION IN A NETWORK ENVIRONMENT

(75) Inventors: Jayaraman R. Iyer, Sunnyvale, CA (US); David P. Lindert, San Jose, CA (US); Viren K. Malaviya, Cupertino, CA (US); John G. Waclawsky, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 10/973,566

(22) Filed: Oct. 26, 2004

(65) Prior Publication Data

US 2006/0088011 A1  Apr. 27, 2006

(51) Int. Cl.
*H04Q 7/24* (2006.01)
(52) U.S. Cl. .................... 370/310; 370/401; 455/406
(58) Field of Classification Search ............... 370/400, 370/310–350, 401; 455/406, 405
See application file for complete search history.

(56) References Cited

U.S. PATENT DOCUMENTS

| | | | |
|---|---|---|---|
| 5,673,259 A | 9/1997 | Quick, Jr. .................... 370/342 |
| 5,905,736 A | 5/1999 | Ronen et al. ................ 370/546 |
| 5,956,391 A | 9/1999 | Melen et al. ................. 379/114 |
| 5,970,477 A | 10/1999 | Roden ......................... 705/32 |
| 5,999,603 A | 12/1999 | Lo et al. ...................... 379/127 |
| 6,047,051 A | 4/2000 | Ginzboorg et al. .......... 379/130 |
| 6,230,012 B1 | 5/2001 | Willkie et al. ............... 455/435 |
| 6,374,112 B1 | 4/2002 | Widegren et al. ............ 455/452 |
| 6,425,003 B1 | 7/2002 | Herzog et al. ................ 709/223 |
| 6,456,604 B1 | 9/2002 | Lee et al. ..................... 370/328 |
| 6,463,274 B1 | 10/2002 | Robertson .................... 455/406 |
| 6,466,556 B1 | 10/2002 | Boudreaux ................... 370/331 |
| 7,145,994 B2 * | 12/2006 | Moreau et al. .......... 379/114.01 |
| 7,242,665 B2 * | 7/2007 | Langille et al. .............. 370/217 |
| 2002/0059114 A1 | 5/2002 | Cockrill et al. ............... 705/27 |
| 2002/0188562 A1 | 12/2002 | Igarashi et al. ................ 705/40 |
| 2003/0027595 A1 | 2/2003 | Ejzak .......................... 455/560 |
| 2003/0031160 A1 * | 2/2003 | Gibson Å et al. ............ 370/349 |
| 2004/0101117 A1 | 5/2004 | Koskinen et al. ............ 379/126 |

(Continued)

FOREIGN PATENT DOCUMENTS

WO    WO 98/26381    12/1997

(Continued)

OTHER PUBLICATIONS

PCT, "Notification of Transmittal of the International Search Report or the Declaration," International Application No. PCT/US05/36845, 10 pgs.

*Primary Examiner*—Min Jung
(74) *Attorney, Agent, or Firm*—Baker Botts L.L.P.

(57) ABSTRACT

A method for distributing information in a network environment is provided that includes receiving one or more packets from a communication flow and recognizing a universal generic identification (UGI) associated with the communication flow. The UGI corresponds to an end user that is associated with the communication flow. The UGI is operable to enable a service for the end user in a first network and a second network, the first and second networks being different, whereby either the first network or the second network operates as a home network for the end user.

40 Claims, 2 Drawing Sheets

U.S. PATENT DOCUMENTS

2004/0267645 A1* 12/2004 Pollari .......................... 705/34
2005/0147084 A1* 7/2005 Zhang et al. ................. 370/352
2005/0149731 A1* 7/2005 Leppanen et al. ........... 713/168
2006/0072595 A1* 4/2006 Broberg et al. .............. 370/410
2006/0085310 A1* 4/2006 Mylet et al. ................... 705/35

FOREIGN PATENT DOCUMENTS

WO    WO 99/31610    12/1998

* cited by examiner

| | SERVICE INFORMATION 56 | | | | | |
|---|---|---|---|---|---|---|
| RELATIONSHIPS 54 | PRESENCE INDICATOR | ACTIVE | AUTH | ACCT | CURRENT IP ADDRESS | SECURITY CODES |
| NET$_{CABLE}$ | | | | | | |
| NET$_{ADSL}$ | 1 | | | | | |
| NET$_{MO1}$ | | | | | | |
| NET$_{MO2}$ | 2 | | | | | |
| ⋮ | ⋮ | ⋮ | ⋮ | ⋮ | ⋮ | ⋮ |
| ENTERPRISE-A | | | | | | |
| NET$_{802.11}$ | | | | | | |
| NET$_{MVNO}$ | 3 | | | | | |

SYSTEM AND METHOD FOR ALLOCATING AND DISTRIBUTING END USER INFORMATION IN A NETWORK ENVIRONMENT

TECHNICAL FIELD OF THE INVENTION

This invention relates in general to the field of network communications and, more particularly, to a system and a method for allocating and distributing end user information in a network environment.

BACKGROUND OF THE INVENTION

Effective network communications is becoming increasingly important in today's society. One aspect of network communications relates to the ability to identify an end user associated with a communication flow. Devices, components, and equipment within a network may wish to glean information from the communication flow in order to provide some capability or enhancement within the network or to provision services for an end user based on his identity or his particular situation.

In attempting to identify an end user associated with a communication flow, network designers generally insert a piece of network equipment somewhere in a communications link such that the communication flow passes through the inserted piece of network equipment. This network configuration suffers from a number of drawbacks. For example, pieces of network equipment that are inserted into the communication pathway may slow overall network communications because the communication flow needs to be received and then retransmitted at each piece of equipment in the communication flow. In addition, some of the inserted network devices may wish to process the information within the communication flow before communicating the data to a next destination. Additionally, the processing of the information may affect the communications format and/or present compatibility or encryption/decryption problems for devices and equipment positioned downstream of the processing devices. Accordingly, the ability to properly identify an end user in a network environment, without inhibiting system performance, presents a significant challenge to service providers, network operators, and component manufacturers.

SUMMARY OF THE INVENTION

From the foregoing, it may be appreciated by those skilled in the art that a need has arisen for an improved network communications approach that provides the capability for network devices or components to receive information associated with communication flows. In accordance with one embodiment of the present invention, a system and a method for distributing information in a network environment are provided that substantially eliminate or greatly reduce disadvantages and problems associated with conventional identification techniques.

According to one embodiment of the present invention, there is provided a method for distributing information in a network environment that includes receiving one or more packets from a communication flow and recognizing a universal generic identification (UGI) associated with the communication flow. The UGI corresponds to an end user that is associated with the communication flow. The UGI is operable to enable a service for the end user in a first network and a second network, the first and second networks being different, whereby either the first network or the second network operates as a home network for the end user.

Certain embodiments of the present invention may provide a number of technical advantages. For example, according to one embodiment of the present invention, a network communications approach is provided that allows multiple devices or components within a network environment to receive information relating to a communication flow without burdening the overall communication system. Effective communications may be realized because of the UGI, which is used to correlate a profile to the end user. This further allows for a realization of flexible business models, whereby services can be delivered and billed without the need for a physical infrastructure. This can also enable a service provider to only provide a physical infrastructure and to support service delivery to all attached (or roaming) customers (i.e. a service provider does not necessarily have customers of his own).

Yet another technical advantage relates to the ability to allow users to dynamically connect to any network via use of the UGI. This could further accommodate international roaming across any type of access network. Moreover, such a specification could allow any number of static business relationships to be achieved through predetermined definitions at a subscription time or, in the alternative, dynamic relationships may be triggered instantly between two networks. Static or dynamic on-demand business relationships can also be facilitated between enterprise IT departments, as well as service providers and mobile operators. This could extend to on-demand business access to enterprise IT applications (for example, as a visitor to a business partner network).

The UGI also allows an existing billing infrastructure to be utilized without modification. For example, an existing domain name server (DNS) and an authentication, authorization, and accounting (AAA) infrastructure of individual networks can be used for billing because the respective AAA networks can communicate using existing protocols. Moreover, the ID server can be modified (and service information available to users and third party applications) via a policy template, which may be included in the ID server (or provided elsewhere in any appropriate location).

Another technical advantage associated with one embodiment of the present invention relates to easier manageability for network architectures. This is achieved by having a single UGI in the communication flow that allows changes or modifications to the network to implicate only a single element instead of a series of devices or components in the communication flow. The integration of new components in the network is also made easier because only the UGI is affected by the change in a network configuration and/or the ID server. Also, formatting, encryption/decryption, and compatibility issues with new equipment being introduced in the communication flow will only implicate the UGI and/or the ID server instead of every piece of network equipment in the stream of the communication flow.

Still another technical advantage offered by one embodiment of the present invention relates to its flexibility. The use of the UGI provides a single point of entry for potential overrides to the end user identity/correlation function. This may operate to ensure that a proper end user profile is accurately matched with a given communication flow. Thus, the architecture provides better precision and improved fault tolerance than would otherwise be obtained by using several points or nodes in the network, which attempt to offer a portion of this functionality. Moreover, the flexibility of the UGI is further reflected by the ability to correlate an identity of an end user across disparate network access technologies.

This is true because each network data source may be treated as an alternative data source and processed accordingly.

Yet another technical advantage associated with one embodiment of the present invention relates to the failover capabilities within the network. The non-operation of a single component seeking information relating to the communication flow will not affect the overall operation of the network. This is true because the UGI and the ID server are generally the only elements involved in identifying the communication flow. The involvement of the UGI and the ID server is generally passive and, therefore, their non-operation does not influence system performance or inhibit network operations. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
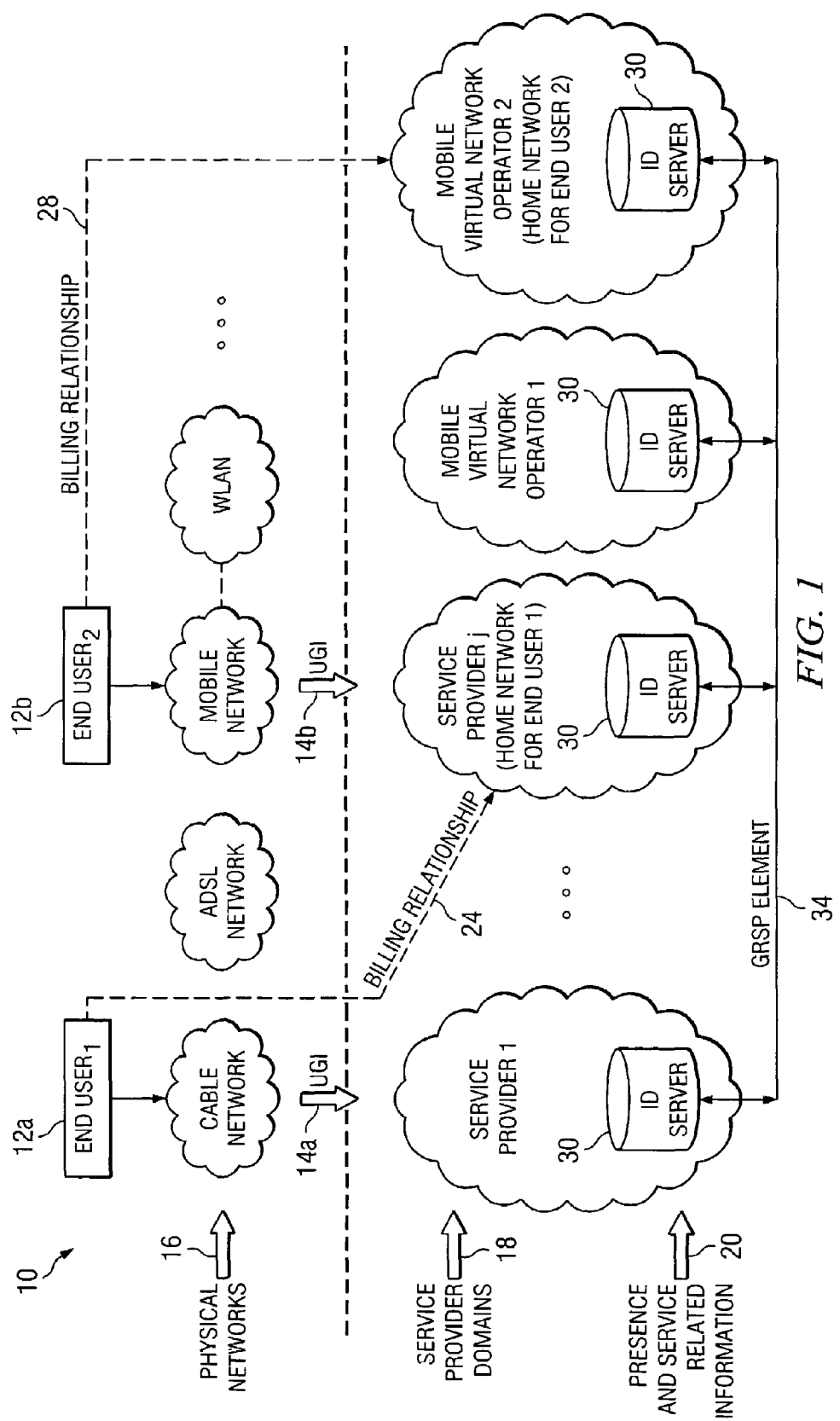
FIG. 1 is a simplified block diagram of a communication system for allocating and distributing data in a network environment.

FIG. 1 is a simplified block diagram of a communication system 10 for allocating, distributing, and sharing identification information in a network environment in accordance with one embodiment of the present invention. Communication system 10 includes an end user 1 12a and an end user 2 12b, each of whom may be provided with (or assigned) a universal generic identifier (UGI) (illustrated by UGIs 14a and 14b respectively in FIG. 1). Communication system 10 may also include multiple physical networks 16 (e.g. a cable network, an asymmetric digital subscriber line (ADSL) network, a mobile network, a wireless local area network, etc.). Communication system 10 may also include a number of service provider domains 18 (e.g. a service provider 1, a service provider j (which is illustrated as the home network for end user 1), a mobile virtual network operator 1, a mobile virtual network operator 2 (which is illustrated as the home network for end user 2, etc.). Note that in this example, which is used for purposes of example and teaching only, a set of billing relationships 24 and 28 are present and implicate the two end users. Each of service provider domains 18 may include an identification (ID) server 30, which facilitates the reception and delivery of presence and service related information 20. In addition, all of the ID servers 30 may include a link to a generic routing service protocol (GRSP) element 34, which operates as a generic data transport.

Communication system 10 may be generally configured or arranged to represent 2.5G communication architecture applicable to a global system for mobile (GSM) environment. Communication system 10 may also be configured to represent a first generation or a 3G UMTS architecture, a wire based network, a dial-up architecture, other appropriate mobile data networks associated with GPRS protocols, or any other suitable communicative platform, arrangement, or configuration in accordance with particular needs.

According to the teachings of one embodiment of the present invention, communication system 10 allows users to attach to different service provider networks using UGIs 14a and 14b, GRSP element 34, and an ID server 30. A given end user can register for (or be assigned) a UGI on his home network ID server. Some of the bits in the UGI can identify specific information about the user such as a user's home network, for example. When used, the UGI can reflect a portable logical representation of the presence of the user and, further, allow a dynamic authorization of a user for connecting to any number of networks. This includes the ability to access enterprise networks. The use of the UGI also provides the ability to track and to bill for user activity outside the home network. The UGI can be presented by the user equipment upon attachment to any network and enable roaming over multiple disparate networks (e.g. over a cable network, an ADSL network, a mobile operator network, etc.). The UGI can be resolved in any appropriate fashion (e.g. through existing domain name server (DNS) and authentication, authorization and accounting (AAA) mechanisms, or in a new manner that uses a proprietary protocol) to provide a pointer (i.e. an index) back to the needed user information at user's home network. The UGI also enables presence, billing, and application activity information to be sent to the home network.

Communication system 10 can also utilize user information (e.g. presence, access capabilities including parental controls, security keys, quality of service (QoS) capabilities and authorization, etc.) to use network resources and to access content. Such content can be disseminated to requesters in external networks, which authorize and bill a user (or an application) for the purpose of delivering services. Information such as presence, AAA, location information, and user preferences can be used to facilitate contact between individuals (potentially in disparate networks) and also between applications and individuals (again, potentially in disparate networks). This, in turn, enhances application value and increases the efficiency of service delivery. Such operations may also reduce the cost to provision new services because new services can be provided outside the home network.

Note that for purposes of teaching and discussion, it is useful to provide some background overview as to the way in which the tendered invention operates. The following foundational information describes one problem that may be solved by the present invention. This background information may be viewed as a basis from which the present invention may be properly explained. Such information is offered earnestly for purposes of explanation only and, accordingly, should not be construed in any way to limit the broad scope of the present invention and its potential applications.

The concept of international roaming between signaling system seven (SS7) based wireless networks of the same type (e.g. GSM or UMTS) is currently being deployed. This operation provides mobile subscriber voice services ubiquitously. In addition, the GPRS model is being leveraged using the same principle. Generic identification of an end user is generally achieved today in several systems (e.g. using an MSISDN or the username with a NAI format). Such configurations can be used to roam across multiple networks such as GPRS and WLAN.

In contrast to such architectures, communication system 10 adopts use of cooperating ID servers and a UGI, which provides for on demand access to services. Moreover, such operations may be presented or deployed between disparate networks. Thus, communication system 10 can provide: 1) service delivery and service mobility between disparate networks; and 2) a UGI with appropriate ID servers that provide ID management in a generic form across disparate networks. Communication system 10 offers a method of attaching and accessing services (across similar and dissimilar networks), which can be achieved over IP-based networks that allow the end users to access any type services from the attached network or from the home network if so desired.

The use of GRSP element 34 over IP (or any networking technology), facilitates the exchange of end user information between any two networks such that services are delivered ubiquitously for the end user. In addition, GRSP element 34 and/or the UGI may be used to indicate the presence of the user on a network (e.g., where the service was last delivered). This offers a powerful tool for interested network equipment, as outlined in greater detail below.

Communication system 10 can assemble user information and allow explicit control of the distribution of this information to multiple third party applications, as well as users located outside the home network environment. The system can also provide for the transfer of semantic information (to allow service delivery) by using cooperating functions located in two or more networks. The system can also allow network and network services information to be bundled for individual users to provide numerous virtual views of network service capabilities. ID servers 30 may allow a history of presence activity: recognizing the last networks that were visited by a given end user using a weighting metric (e.g. 1, 2, 3, etc.) instead of a binary presence indicator. Additional details relating to such a capability are provided below with reference to FIG. 2.

Note that communication system 10 offers a network communications approach that allows multiple devices or components within a network environment to receive information relating to a communication flow without burdening the overall communication system. Effective communications may be realized because of the UGI that is used to successfully correlate a profile with the end user. This further allows for a realization of flexible business models, whereby services can be delivered and billed without the need for a physical infrastructure. This can also enable a service provider to only provide a physical infrastructure and to support service delivery to all attached (or roaming) customers (i.e. a service provider does not have customers of his own).

Communication system 10 also accommodates international roaming across any type of access network. Moreover, such a specification could allow any number of static business relationships to be achieved through predetermined definitions at a subscription time or, in the alternative, dynamic relationships may be triggered instantly between two networks. Static or dynamic on-demand business relationships can also be facilitated between enterprise IT departments, as well as service providers and mobile operators. This could extend to on-demand business access to enterprise IT applications (for example as a visitor to a business partner network).

The UGI allows an existing billing infrastructure to be utilized without modification. For example, existing DNS and AAA infrastructure of individual networks can be used for billing because the respective AAA networks can communicate using the existing protocols. Moreover, ID server 30 can be modified (and service information available to users and third party applications) via a policy table or template.

The proffered architecture also allows for an easier manageability for network architectures. This is achieved by having a single UGI in the communication flow that allows changes or modifications to the network to implicate only a single element instead of a series of devices or components in the communication flow. The integration of new components in the network is also made easier because only the UGI is affected by the change in network configuration. Also, formatting, encryption/decryption, and compatibility issues with new equipment being introduced in the communication flow will only implicate the UGI instead of every piece of network equipment in the stream of the communication flow.

The present system also offers enhanced flexibility. The use of the UGI provides a single point of entry for potential overrides to the end user identity/correlation function. This may operate to ensure that a proper end user profile is matched with a given communication flow. Thus, the architecture provides better accuracy and improved fault tolerance than would otherwise be obtained by using several points or nodes in the network, which attempt to offer a portion of this functionality. Moreover, the flexibility of the UGI is further reflected by the ability to correlate an identity of an end user across disparate network access technologies. This is true because each network data source may be treated as an alternative data source and processed accordingly.

The architecture of communication system 10 also provides failover capabilities within the network. The non-operation of a single component seeking information relating to the communication flow will not affect the overall operation of the network. This is true because the UGI and ID server 30 are generally the only elements involved in the communication flow. The involvement of the UGI and ID servers 30 is generally passive and, therefore, their non-operation does not impact system performance.

End users 12a and 12b are clients or customers seeking to initiate or to establish a communication tunnel, link, or session in communication system 10 via physical networks 16. End users 12a and 12b may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End users 12a and 12b may also be inclusive of a suitable interface to the human user, such as a microphone, a display, a keyboard, or other terminal equipment (such as for example an interface to a personal computer or to a facsimile machine in cases where the end user is used as a modem). End users 12a and 12b may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, or script data, or any type of source or object code, or any other suitable information in any appropriate format that may be communicated from one point to another.

In operation of a particular embodiment of the present invention, end user 12a or end user 12b initiates (or causes to be initiated) a communication flow within a network. A UGI accompanies the communication flow such that an identity of the end user is readily available to a receiving entity. An interested piece of network equipment may readily use the UGI to correlate the originating end user to a profile or policy (which may be retrieved from the end user's home network, provided in ID server 30, or located at any other appropriate site) Additional details relating to the information that is stored in each user's profile is provided below.

Physical networks 16 each represent a series of points or nodes of interconnected communication paths for receiving and transmitting packets of information that propagate through communication system 10. Each of physical networks 16 may offer some service or capability to a given end user (or set of end users). In some cases, physical networks 16 simply offer connectivity for their clients or customers. Physical networks 16 may be coupled to one or more additional network elements (e.g. service provider networks). Physical networks 16 may offer a communications interface between a given end user and a requested network destination. Physical networks 16 may be any suitable architecture, such as a local area network (LAN), an enterprise network, a virtual private network (VPN), a metropolitan area network (MAN), or a wide area network (WAN) or any other appropriate architecture or system that facilitates communications in a network environment. Physical networks 16 may implement a TCP/IP communications language architecture in a particular embodiment of the present invention. However, physical networks 16 may alternatively implement any other suitable communication protocol for transmitting and receiving information within communication system 10.

Service provider domains 18 offer some application, feature, enhancement, or capability to a potential end user. As used herein in this document, the term "service" includes all of these elements. Such elements, for example, could relate to the ability to provide mobile communications to the end user. Other services may relate to connectivity, voice over IP, mobile wireless call features (call waiting, call forwarding, three-way calling, caller I.D., etc.), video phone, video streaming, video conferencing, internet access/browsing, intranet access, VPN systems, emailing, file transfer, M-commerce, location services (global positioning system (GPS) architectures, navigation, traffic conditions), and value added services (news, weather, sports, game, entertainment, music, etc.), for example.

In operation, communication system 10 solves the problem of how to allow a mobile or a nomadic user to dynamically access all network services from any available access network. Communication system 10 also provides a scenario that allows other users to find and to communicate with a specific targeted end user. Mobile or nomadic users generally have access to a large number of networks and network access technologies. Communication system 10 allows an end user to just physically (wired or wirelessly) plug into any available access network and use their familiar services, access their enterprise applications, and to allow others to easily find and communicate with them. This ideal situation would enhance user productivity, increase convenience, and augment service provider revenue.

GRSP element 34 allows multiple ID servers 30 to share information associated with one or more UGIs in a dynamic fashion. For example, an end user may have a subscription to a cable network, which may store the end user's identity in any appropriate format. For whatever reason, the end user may opt to fly to Germany to conduct some business. Once arriving in the new region, an end user can initiate contact with the cable network, which can then share this identity information with other providers. Consider FIG. 1, where two end users are shown. These two users (when traveling) have a number of physical access networks available for their use. In this scenario, end user 1 has a billing relationship 24 with service provider j. This corresponds to end user 1's home network. End user 2 has a billing relationship 28 with mobile virtual network operator 2. This corresponds to end user 2's home network. Currently the two users are attached to physical networks not associated with their home network. End user 1 is attached to the cable network and end user 2 is attached to a wireless mobile operator network.

These physical access networks can be owned by service providers that do not represent the home networks for end user 1 or end user 2 (nor do these networks have a billing relationship with either user in this example). The attachment process for both users is as follows: 1) attach the individual communications device to the physical access network; 2) device or individual presents the UGI to the network on which they are roaming; 3) if attaching to home network then the process moves directly to step 5; 4) if attached to another (non-home) network, then contact home network using GRSP element 34 for the needed information (uniquely identified by the UGI); 5) the home network does authentication and authorization of the user; 6) if permission is denied then a reject message is sent (potentially with cause) and the end user is not allowed attachment; 7) if permission is granted then the billing system is notified (e.g. via a AAA server) and presence information (and other information) is updated in the end user's home network ID server; and 8) the attachment is complete and service requests and billing records flow therefrom. This achieves the ubiquitous connectivity for the end user.

Once a user has successfully attached to the network (home or roaming network), the UGI can be used to retrieve and update information about the current user location, services accessed or allowed, presence of the user, etc. in his home network ID server. Service delivery can be accomplished through the following steps. (In the following example, assume a video chat is initiated by someone who wants to contact either end user 1 or end user 2.) The service delivery steps are as follows: 1) a video chat is initiated and sent to the (roaming) target individual; 2) an individual that initiated the video chat triggers a request for the UGI of the target individual. (Note that some DNS activity may be involved to find the UGI information and to get the home network of the target individual.); 3) this operation becomes a query to the target individuals' home ID server (and possibly to his network presence component to get the latest information); 4) if the individual is active in his home network or active in a roaming network, then the video chat starts; and 5) if the individual is not active in any network then a service denied message (with optional cause) is sent to the individual who initiated the video chat.

Figures 2, 3:
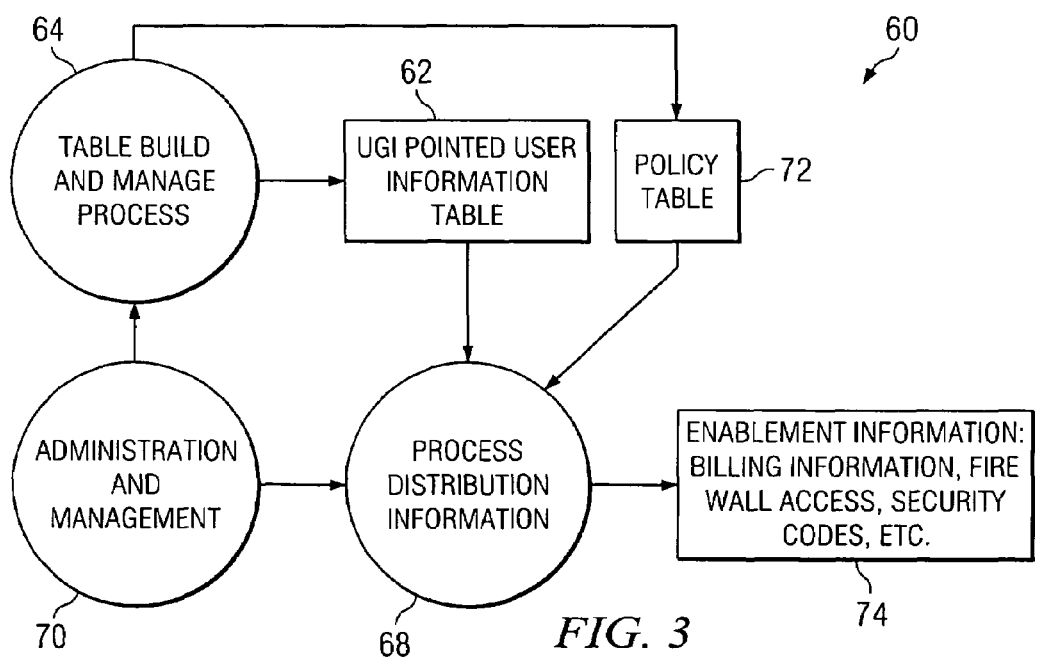
FIG. 2 is a simplified diagram of an example of end user information that may be distributed in the network.
FIG. 3 is a flowchart illustrating a series of steps for allocating and distributing data in a network environment.

FIG. 2 is a simplified block diagram illustrating additional details relating to information stored within ID server 30. In a particular embodiment of the present invention, a table 50 is provided (in each of ID servers 30) that includes a service information segment 56 and a relationships segment 54. Relationships segment 54 includes a number of illustrated networks. Information segment 56 includes a presence indicator, an active status demarcation, an authorization or an authentication parameter, an accounting segment, a current IP address element, and a security codes object. Such categories are arbitrary and can readily be replaced with other elements where appropriate and based on particular networking needs. The items of FIG. 2 offer only one of a myriad of potential objects that may be included in table 50 (or within ID server 30 in some other format).

FIG. 2 reflects an example of the user information maintained at each home network for a particular use. This information can be replicated for all users at their home network. Hence, FIG. 2 shows an example of the kinds of information that can be kept at ID server 30. This information could be a listing (as shown) of networks the user is allowed to attach to, for example, because of a subscription or a service arrangement between service providers. Enterprise networks could be part of the allowed access networks. The list of networks can be static or be allowed to change dynamically. For example, such a change could occur after a credit transaction, whereby another network could be added to the list of available networks or an end user could be authorized as a visitor to a business partner network. In addition presence information and historical information can be maintained about user activity (e.g. in the context of problem determination operations).

Thus, the UGI has the ability to recall or to remember where the end user has previously been (i.e. which network has been previously visited). For example, it could be recorded that end user John James visited a cable network, then a wireless network, and then a WLAN. In addition, the UGI can store the last network that was visited. Now, if someone wanted to reach John James (e.g. a financial business in the context of executing a trade for example), the UGI can identify where John James operated last. Thus, there exists a strong probability that John James is still there in that network location. In addition, the UGI can be used to derive a statistical relevance associated with the likelihood of finding the end user in a given network (e.g. based on the frequency associated with where the end user visits). Hence, ID server 30 can be leveraged to direct traffic in the network based on a statistical analysis. This correlates to the presence indicators of FIG. 2. The presence value corresponds to a weight metric, which can be correlated to the frequency of usage of the networks by the end user.

Note that the elements provided in ID server 30 are offered as potential examples and, thus, should not be construed to limit or to constrain the teachings of the present invention. Additionally, ID server 30 may be provided external to the service provider network where appropriate or combined with any other piece of network equipment in accordance with particular needs.

In one embodiment, table 50 is a data storage unit provided in software that tracks, maintains, or identifies a given end user, as well as types of information that the end user may seek to obtain. In addition, table 50 may be configured such that it shares information with network vendors or other equipment within the network. Table 50 may also be used in order to build information or an in-memory data store and hold it persistently and potentially as long as the end user is active in communication system 10.

Hence, ID server 30 may include table 50 (transient or otherwise) for storing any appropriate end user information. For example, table 50 may include information associated with the service provider offering service to the end user, network characteristics such as information related to packet data serving node (PDSN) characteristics, or any other suitable user profile characteristic or parameter that may be relevant to the communication flow.

The information stored in table 50 may also include the IP address associated with the end user, the access devices used by given users, or any other suitable information or parameters in accordance with particular needs. Table 50 stores one or more end user profiles associated with clients or customers in the network. The profiles may also be provided in a given UGI. Thus, all of the information provided in table 50 may also be provided in respective UGIs and vice versa. Hence, a certain amount of redundancy may exist between ID server 30, UGIs 14a and 14b, and table 50. The end user profiles may contain any appropriate parameters or characteristics of the end user (or of the network) that may affect treatment of communications links, tunnels, or sessions.

Each profile may also include data reflecting bandwidth allocation parameters and/or information relating to QoS characteristics designated for the end user. ID server 30 may also provide a point of management to a service provider (or any other entity) in order to control one or more operations associated with the end user such as quality of service, access, privileges, or network enhancements.

Table 50 may be populated in a variety of ways. For example, when the end user connects to the network, a RADIUS request is made on its behalf by a network access server (NAS) or any other appropriate device. In a mobile networking scenario this request, generally referred to as an Access-Request, may contain the user-ID in the User-Name attribute or in the calling station-ID attribute, which uniquely identifies which end user is requesting the information from the network. If the AAA server authenticates and authorizes the end user successfully, a RADIUS Access-Accept message may be communicated back to the RADIUS client with an IP address in the framed-IP address attribute. The IP address may be the address used by the end user when it sends IP packets to an internet gateway. Entries within table 50 may be cleaned up, deleted, or updated periodically (or alternatively updated or changed based on some event or modification to system parameters) in order to accurately reflect one or more source profiles associated with one or more end users. Other parameters to be stored in the end user profile may include data relating to the network access technology being implemented by the end user and its associated characteristics, preferences relating to the network communications, or the physical or geographic location of the end user.

Note that because certain enhancements should be made to several network components to achieve the targeted signaling of the present invention, it is critical to explain their internal structures. In a particular embodiment of the present invention, ID server 30, UGIs 14a and 14b, and/or GRSP element 34 include software that is operable to facilitate appropriate signaling for purposes of identifying an end user in the context of network connectivity, access, services, or applications. The augmentation or enhancement may be provided in just one of these elements, two elements, or in all three elements. Such design choices may be based on particular networking or configuration needs. Alternatively, this identification capability may be provided by any suitable hardware, component, device, ASIC, field-programmable gate array (FPGA), microprocessor, read only memory (ROM) element, random access memory (RAM) element, erasable programmable ROM (EPROM), electrically erasable programmable ROM (EEPROM), processor, algorithm, element or object that is operable to perform such operations. Note that such a signaling functionality may be provided external to the identified components (e.g. external to the service providers), allowing appropriate identification to be achieved for interested components in the network. Note also that the term "ID server" is not confined to simply a "server" architecture, as ID server 30 may include (or be replaced with) any of the items identified above.

FIG. 3 is a simplified schematic diagram that shows an example process 60 for creating and modifying ID server 30 and/or a policy table. The policy table may be provided within ID server 30 or provided in some other appropriate location, such as on its own separate policy server. In other embodiments, the policy table and/or its information may be provided in ID server 30 or included in a given UGI. FIG. 3 reflects a process showing the UGI and the services information aggregation and distribution flow: further reflecting the internal relationships between the UGI and the policy table.

In block 62, a UGI pointed user information table component is provided. The table, which may be provided in ID server 30, may include a number of end users. The table may be used to distribute the identity information to the service providers. Hence, an index may be utilized by the UGI such that a given UGI can access the table and find an entry. A process for the distribution of information is invoked by block 68. Block 70 reflects the notion that new customers and subscribers may enroll in a financial plan or service contract in order to participate in such a network arrangement.

Block 70 may also correlate to the collection of moneys and the registration for its members. Block 64 correlates to an ability to build the table and to manage processes associated with the table. Thus, a person actually inputs an entry (for the end user) into the user information table. Block 64 may interact with block 62 such that updated end user information is reflected in the user information table, whereby block 68 may be invoked to suitably process this information. When a subscriber attempts to access a service, a policy table (which, for example, may include a security rule or a parameter) may be invoked. This is reflected by block 72. This overall process may be executed in a systematic fashion in order to achieve connectivity for the end user, as well as to provide dynamic and ubiquitous network capabilities for participating end users.

Some of the steps illustrated in FIG. 3 may be changed or deleted, where appropriate, and additional steps may also be added to the flowchart. These changes may be based on specific system architectures or particular communication arrangements or configurations and do not depart from the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in particular environments, the present invention may be used in any networking environment that seeks to glean information from a communication flow. Communication system 10 may be used in conjunction with asynchronous transfer mode (ATM), frame relay, X.25, or any other type of packet or circuit-switched network.

It is also important to note that the teachings of the present invention may be readily imparted to an end user (or to a group of end users) such that the end user may sign up for (or enlist or enroll in) a charging plan that includes the operations and functions described herein. Thus, an end user could be enrolled in a charging plan that utilizes service tagging in order to achieve appropriate charging in a network environment. A corresponding bill may subsequently be generated that reflects such an arrangement. Such an arrangement may be reflected by a simple customer arrangement between a service provider and a client. In a similar fashion, an end user could be enrolled in a security policy plan, whereby similar subscribing occurs and billing ensues. The present invention is replete with such financial arrangements and readily encompasses all such possibilities.

Additionally, although the present invention has been described with reference to communications between the end user and an AAA server, the UGI mechanism as described herein may be implemented for communications between any two components within a network. The present invention has merely described an example network environment for teaching purposes. This should not be construed to limit how or where the UGI mechanism is implemented. It should be clear from the foregoing that the UGI mechanism may be used outside the field of an AAA configuration.

In addition, although ID server 30 has been illustrated as a separate element, it may be included in an AAA server or in any other element or component within communication system 10. ID server 30 has been illustrated in FIG. 1 in a designated position for purposes of teaching, but ID server 30 may be positioned anywhere in the network and included in any additional network equipment or device where appropriate. ID server 30 may also be used in legacy system architectures where appropriate.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for distributing information in a network environment, comprising:
an identification (ID) server operable to receive one or more packets from a communication flow and to recognize a universal generic identification (UGI) associated with the communication flow, wherein the UGI is assigned to an end user that is associated with the communication flow, and wherein the UGI is operable to enable a service for the end user in a first network and a second network, the first and second networks being different, whereby either the first network or the second network operates as a home network for the end user, the UGI reflecting a portable logical representation of the presence of the end user and allowing a dynamic authorization of the end user for connecting to a plurality of disparate networks.

2. The apparatus of claim 1, wherein a selected one, but not both, of the first and second networks have a billing relationship with the end user.

3. The apparatus of claim 2, wherein the selected network is operable to interface with the other network in order to create a financial relationship for the end user such that the end user is enabled to engage in activity in the other network.

4. The apparatus of claim 2, wherein the selected network performs authentication and authorization procedures for the end user.

5. The apparatus of claim 2, wherein the ID server communicates data associated with the end user to one or more additional ID servers using a generic routing service protocol (GRSP) element.

6. The apparatus of claim 2, wherein if permission is denied for access to the other network, then a reject message is sent to the end user, and wherein the reject message is operable to include a cause associated with a failure to obtain permission.

7. The apparatus of claim 2, wherein if permission is granted to access the other network, then a billing protocol is initiated.

8. The apparatus of claim 7, wherein once permission is granted, at least a selected one of end user location information, service accessed or service allowed information, and presence information associated with the end user is updated in the ID server.

9. The apparatus of claim 7, wherein once permission is granted, a service request and a billing record is generated for the end user.

10. The apparatus of claim 1, wherein the profile comprises user information that includes one or more parameters associated with the end user, the parameters being selected from the group consisting of:
  a) a physical location associated with the end user;
  b) a network access technology associated with the end user;
  c) a network service preference associated with the end user;
  d) a quality of service associated with the end user;
  e) a presence parameter associated with the end user;
  f) a parental control associated with the end user;
  g) a security key associated with the end user;
  h) an authorization parameter associated with the end user;
  i) an authentication parameter associated with the end user;
  j) a status indicator associated with activity associated with the end user; and
  k) an IP address associated with the end user.

11. The apparatus of claim 1, wherein the UGI may be resolved in order to provide access to a physical network, and wherein the physical network is a selected one of a wireless local area network (WLAN), a mobile network, a cable network, and an asymmetric digital subscriber line (ADSL) network.

12. The apparatus of claim 1, wherein the UGI provides a point of management in order to control one or more network operations associated with the end user that initiated the communication session.

13. A method for distributing information in a network environment, comprising:
  receiving one or more packets from a communication flow; and
  recognizing a universal generic identification (UGI) associated with the communication flow, wherein the UGI is assigned to an end user that is associated with the communication flow, and wherein the UGI is operable to enable a service for the end user in a first network and a second network, the first and second networks being different, whereby either the first network or the second network operates as a home network for the end user, the UGI reflecting a portable logical representation of the presence of the end user and allowing a dynamic authorization of the end user for connecting to a plurality of disparate networks.

14. The method of claim 13, wherein a selected one, but not both, of the first and second networks have a billing relationship with the end user.

15. The method of claim 14, wherein the selected network is operable to interface with the other network in order to create a financial relationship for the end user such that the end user is enabled to engage in activity in the other network.

16. The method of claim 14, wherein if permission is denied for access to the other network, then a reject message is sent to the end user, and wherein the reject message is operable to include a cause associated with a failure to obtain permission.

17. The method of claim 14, wherein if permission is granted to access the other network, then a billing protocol is initiated.

18. The method of claim 17, wherein once permission is granted, at least a selected one of end user location information, service accessed or service allowed information, and presence information associated with the end user is updated in the ID server.

19. The method of claim 17, wherein once permission is granted, a service request and a billing record is generated for the end user.

20. A system for distributing information in a network environment, comprising:
  means for receiving one or more packets from a communication flow; and
  means for recognizing a universal generic identification (UGI) associated with the communication flow, wherein the UGI is assigned to an end user that is associated with the communication flow, and wherein the UGI is operable to enable a service for the end user in a first network and a second network, the first and second networks being different, whereby either the first network or the second network operates as a home network for the end user, the UGI reflecting a portable logical representation of the presence of the end user and allowing a dynamic authorization of the end user for connecting to a plurality of disparate networks.

21. The system of claim 20, wherein a selected one, but not both, of the first and second networks have a billing relationship with the end user.

22. The system of claim 21, wherein the selected network is operable to interface with the other network in order to create a financial relationship for the end user such that the end user is enabled to engage in activity in the other network.

23. The system of claim 21, wherein if permission is denied for access to the other network, then a reject message is sent to the end user, and wherein the reject message is operable to include a cause associated with a failure to obtain permission.

24. The system of claim 21, wherein if permission is granted to access the other network, then a billing protocol is initiated.

25. The system of claim 24, wherein once permission is granted, at least a selected one of end user location information, service accessed or service allowed information, and presence information associated with the end user is updated in the ID server.

26. The system of claim 24, wherein once permission is granted, a service request and a billing record is generated for the end user.

27. Software embodied in a computer readable medium including code for distributing information in a network environment, the code being operable to:
  receive one or more packets from a communication flow; and
  recognize a universal generic identification (UGI) associated with the communication flow, wherein the UGI is assigned to an end user that is associated with the communication flow, and wherein the UGI is operable to enable a service for the end user in a first network and a second network, the first and second networks being different, whereby either the first network or the second network operates as a home network for the end user, the UGI reflecting a portable logical representation of the presence of the end user and allowing a dynamic authorization of the end user for connecting to a plurality of disparate networks.

28. The medium of claim 27, wherein a selected one, but not both, of the first and second networks have a billing relationship with the end user.

29. The medium of claim 28, wherein the selected network is operable to interface with the other network in order to create a financial relationship for the end user such that the end user is enabled to engage in activity in the other network.

30. The medium of claim 28, wherein if permission is denied for access to the other network, then a reject message is sent to the end user, and wherein the reject message is operable to include a cause associated with a failure to obtain permission.

31. The medium of claim 28, wherein if permission is granted to access the other network, then a billing protocol is initiated.

32. The medium of claim 31, wherein once permission is granted, at least a selected one of end user location information, service accessed or service allowed information, and presence information associated with the end user is updated in the ID server.

33. The medium of claim 31, wherein once permission is granted, a service request and a billing record is generated for the end user.

34. A method for signing up an end user in a network environment, comprising:
    enrolling an end user in a charging plan;
    generating a bill for the end user that corresponds to the charging plan, wherein the charging plan is based on a plurality of operations that include:
    receiving one or more packets from a communication flow; and
    recognizing a universal generic identification (UGI) associated with the communication flow, wherein the UGI is assigned to an end user that is associated with the communication flow, and wherein the UGI is operable to enable a service for the end user in a first network and a second network, the first and second networks being different, whereby either the first network or the second network operates as a home network for the end user, the UGI reflecting a portable logical representation of the presence of the end user and allowing a dynamic authorization of the end user for connecting to a plurality of disparate networks.

35. The method of claim 34, wherein a selected one, but not both, of the first and second networks have a billing relationship with the end user.

36. The method of claim 35, wherein the selected network is operable to interface with the other network in order to create a financial relationship for the end user such that the end user is enabled to engage in activity in the other network.

37. The method of claim 35, wherein if permission is denied for access to the other network, then a reject message is sent to the end user, and wherein the reject message is operable to include a cause associated with a failure to obtain permission.

38. The method of claim 35, wherein if permission is granted to access the other network, then a billing protocol is initiated.

39. The method of claim 38, wherein once permission is granted, at least a selected one of end user location information, service accessed or service allowed information, and presence information associated with the end user is updated in the ID server.

40. The method of claim 38, wherein once permission is granted, a service request and a billing record is generated for the end user.

* * * * *